US010048954B2

(12) United States Patent
Ahmed

(10) Patent No.: US 10,048,954 B2
(45) Date of Patent: *Aug. 14, 2018

(54) ACCELERATING SOFTWARE BUILDS

(71) Applicant: INTERNATIONAL BUSINESS MACHINES CORPORATION, Armonk, NY (US)

(72) Inventor: Khalid Ahmed, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,700

(22) Filed: Sep. 21, 2016

(65) Prior Publication Data

US 2018/0081652 A1    Mar. 22, 2018

(51) Int. Cl.
*G06F 8/41* (2018.01)
*G06F 17/30* (2006.01)

(52) U.S. Cl.
CPC ...... *G06F 8/4442* (2013.01); *G06F 17/30091* (2013.01); *G06F 17/30132* (2013.01); *G06F 17/30233* (2013.01); *G06F 17/30958* (2013.01)

(58) Field of Classification Search
CPC ............. G06F 8/4442; G06F 17/30091; G06F 17/30132; G06F 17/30233; G06F 17/30958
USPC ........................................................ 717/151
See application file for complete search history.

(56) References Cited

U.S. PATENT DOCUMENTS

| 7,168,064 | B2 | 1/2007 | Ousterhout et al. |
| 7,266,805 | B2 | 9/2007 | Weidman et al. |
| 8,327,330 | B1 | 12/2012 | Yang et al. |
| 8,621,446 | B2 | 12/2013 | Archer et al. |
| 8,972,937 | B2 | 3/2015 | Gu |
| 2004/0261055 | A1* | 12/2004 | Bertelrud ................. G06F 8/41 717/106 |
| 2010/0242022 | A1 | 9/2010 | Wagner et al. |
| 2010/0293533 | A1* | 11/2010 | Andrade ................. G06F 8/10 717/140 |
| 2011/0239195 | A1 | 9/2011 | Lin et al. |
| 2011/0271263 | A1* | 11/2011 | Archer ..................... G06F 8/45 717/149 |

(Continued)

OTHER PUBLICATIONS

IBM, List of IBM Patents or Patent Applications Treated as Related, Appendix P, dated Nov. 21, 2017, 2 pages.

(Continued)

*Primary Examiner* — Philip Wang
*Assistant Examiner* — Daniel Wei
(74) *Attorney, Agent, or Firm* — Tihon Poltavets

(57) ABSTRACT

A set of source files is stored in a shared storage repository for nodes of a distributed computing environment for software compilation. An object file is created based on at least a portion of the set of source files. A directed acyclic graph (DAG) is generated corresponding to a group of software build tasks and the relationship between the software build tasks based on the set of source files. A replication factor for the object file is determined based on the number of relationships of the object file identified from the DAG. The object file is stored in a local memory cache of at least one of the number of the nodes, wherein the number of the nodes is based on the replication factor for the object file.

15 Claims, 8 Drawing Sheets

(56) References Cited

U.S. PATENT DOCUMENTS

2016/0103677 A1    4/2016    Melski

OTHER PUBLICATIONS

Pending U.S. Appl. No. 15/815,745, filed Nov. 17, 2017, entitled: "Accelerating Software Builds", 34 pages.
Bell et al., "Vroom: Faster Build Processes for Java", IEEE Software vol. 32 Issue 2, Jan. 12, 2015, pp. 1-9.
Incredibuild, "Accelerate Your Linux Development", printed May 10, 2016, pp. 1-3, https://www.incredibuild.com/.
Bazel, "Bazel {Fast, Correct}—Choose Two", Correct, reproducible, fast builds for everyone, printed May 10, 2016, pp. 1-3, http://bazel.io/.
Google Engineering Tools, "Build in the Cloud: Accessing Source Code", printed May 10, 2016, pp. 1-7, http://google-engtools.blogspot.ca/2011/06/build-in-cloud-accessing-source-code.html.
Distributed Make (DMAKE), "Distributed Make (dmake)", printed May 10, 2016, pp. 1-8, https://docs.oracle.com/cd/E19422-01/819-3697/dmake.html.
Google, "Google Code Archive", Long-term storage for Google Code Project Hosting, printed May 10, 2016, pp. 1-3, https://code.google.com/p/distcc/.
Kompiler, "Implementing concurrent linking in GNU Gold linker", Introduction to concurrent linking, printed May 10, 2016, pp. 1-3, http://blog.kompiler.org/2015/06/11/implementing-concurrent-linking-in-gnu-gold-linker/.
Taylor, "Airs—Ian Lance Taylor", Concurrent linking, Mar. 24, 2008, pp. 1-12, http://www.airs.com/blog/archives/165.
DMS, "Distributed Make System", printed May 10, 2016, pp. 1-3, http://www.nongnu.org/dms/faq.html.
Mell et al., "The NIST Definition of Cloud Computing", National Institute of Standards and Technology, Special Publication 800-145, Sep. 2011, pp. 1-7.

* cited by examiner

US 10,048,954 B2

ACCELERATING SOFTWARE BUILDS

BACKGROUND

The present invention relates generally to the field of software product development, and more particularly to managing software build tasks and software build artifacts in a software build environment, such as a distributed computing environment.

In software product development, a software build environment may implement a set of processes and programming tools to create a software product. Typically, users of a software build environment (e.g., software product developers) can use the processes and the programming tools as an interface to a software development process. One process implemented by software build environments is software compilation, where a software program (e.g., a compiler) generates executable files from source files containing source code.

SUMMARY

Embodiments of the present invention provide methods, computer program products, and systems for accelerating software builds. A set of source files is stored in a shared storage repository for nodes of a distributed computing environment for software compilation. An object file is created based on at least a portion of the set of source files. A directed acyclic graph (DAG) is generated corresponding to a group of software build tasks and the relationship between the software build tasks based on the set of source files. A replication factor for the object file is determined based on the number of relationships of the object file identified from the DAG. The object file is stored in a local memory cache of at least one of the number of the nodes, wherein the number of the nodes is based on the replication factor for the object file.

DETAILED DESCRIPTION

Figure 1:
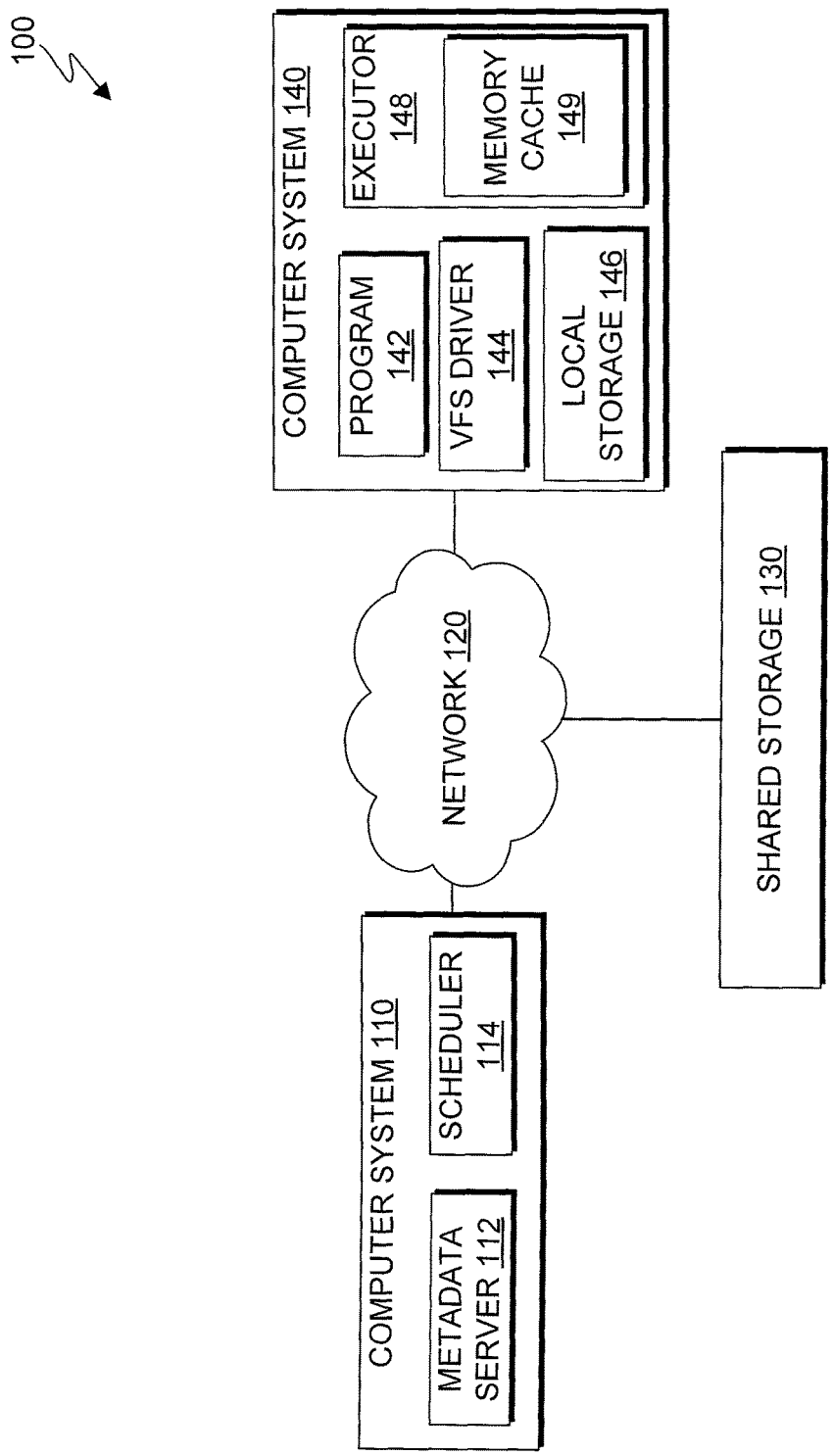
FIG. 1 is a functional block diagram illustrating a software build environment, in accordance with an embodiment of the present invention.

Typically, a software product developer using a software build environment can write source code in a computer programming language to specify functions to be performed by a computer. An executable program or file includes machine code that can be executed by a computer to perform specified functions according to encoded instructions. One or more software programs of a software build environment can perform a process known as software compilation, which uses source code stored in source files to generate software build artifacts (e.g., preprocessed source files, assembly language files, object files, library files, etc.) and finally generate an executable program or file.

For example, a software program, such as a preprocessor, can perform a software build task by preprocessing source code stored in source files (e.g., removing comments in the source code, substituting and expanding macros, etc.) into software build artifacts including preprocessed source files. Subsequently, another software program, such as a compiler, can perform another software build task by compiling the preprocessed source files into software build artifacts including assembly language files. Afterwards, another software program, such as an assembler, can perform another software build task by assembling the assembly language files into software build artifacts including object files written in machine code. Finally, another software program, such as a linker, can perform a final software build task by linking the object files and other software build artifacts (e.g., static library files) to generate an executable program or file.

Dependencies in a software build process occur when a program statement (i.e., instructions) or a software build artifact (e.g., an object file) refers to data of a preceding statement or software build artifact. For example, if class 'A' uses another class or interface 'B,' then 'A' depends on 'B.' Furthermore, 'A' cannot carry out its tasks without 'B,' and cannot be reused without also reusing 'B.' In this example, class 'A' is referred to as a dependant and the class or interface 'B' is referred to as a dependency.

Typically, software build environments may rely on a file system layer, such as a centralized storage repository to store source files containing source code and software build artifacts. Furthermore, software build environments may also rely on a processing layer, such as a distributed computing environment to manage software build workloads. In certain instances, software build environments relying on a separate processing layer and a separate file system layer to handle software build workloads can result in excessive file input/output (I/O) requests to the centralized storage repository. For example, if multiple computers in the distributed computing environment of the processing layer are each executing a software compilation process in parallel, then the subsequent linking process may be performed as a sequential operation, occurring after all the necessary preprocessed source files, assembly language files, and object files are stored in the centralized storage repository. In another example, if multiple users in the software build environment are concurrently initiating a software compilation process, then separate software build artifacts, such as object files, may be generated for source files for each user, even if the source code in the source files remain remains unchanged.

Embodiments of the present invention may handle software build workloads by managing runtime processing of software build tasks and software build artifacts. Embodiments of the present invention may implement a local memory cache and storage repository in each computer of a software build environment, configured to store necessary software build artifacts for a particular linking process carried out by each computer. Embodiments of the present invention may replicate and store necessary software build artifacts in the local memory caches and local storage repositories of designated computers in the software build environment, based on a replication factor. Accordingly, embodiments of the present invention can reduce a number of file I/O requests to the centralized storage repository during handling of the software build workloads.

FIG. 1 is a functional block diagram illustrating software build environment 100, in accordance with an embodiment of the present invention. Software build environment 100 may be a distributed compiling environment, including computer system 110, shared storage 130, and computer system 140, all connected over network 120. In one example, computer system 110, shared storage 130, and computer system 140 can be used in data center, cloud computing, storage area network (SAN), and network attached storage (NAS) applications. In certain embodiments, computer system 110 and computer system 140 represent virtual machines. In general, computer system 110 and computer system 140 are representative of any electronic devices, or combination of electronic devices, capable of executing machine-readable program instructions, in accordance with an embodiment of the present invention, as described in greater detail with regard to FIG. 6. In other embodiments, computer system 110 and computer system 140 may be implemented in a cloud computing environment, as described in greater detail with regard to FIGS. 7 and 8.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computer system 110 and computer system 140, in accordance with an embodiment of the invention.

Computer system 110 represents a platform configured to identify software build tasks and dependencies. Computer system 110 can be a desktop computer, a laptop computer, a specialized computer server, or any other computer system known in the art. In certain embodiments, computer system 110 represents a computer system utilizing clustered computers and components to act as a single pool of seamless resources when accessed through network 120. In this embodiment, computer system 110 includes metadata server 112 and scheduler 114. Scheduler 114 represents a software program configured to create a graphical representation of software build tasks (e.g., map and reduce tasks to complete preprocessing, compiling, assembling, and linking processes) and dependencies. In one embodiment, scheduler 114 creates a directed acyclic graph (DAG) of software build tasks, dependents (e.g., object files, static library files), and dependencies (e.g., executable files). In another embodiment, scheduler 114 creates multiple DAGs, where at least one of the multiple DAGs illustrates dependents and dependencies in a form of a dependency graph, as described in greater detail with regard to FIG. 2A. In general, scheduler 114 creates a directed graph with vertices and edges, where vertices can represent software build tasks, dependents, and dependencies, and where each edge directed from one vertex to another. In one embodiment, scheduler 114 processes a "makefile" to create a DAG of software build tasks, dependents, and dependencies. For example, scheduler 114 can implement an existing tool, such as GNU Make, to preprocess a build graph and output a DAG, or modify the existing tool to add distributed scheduling logic.

Scheduler 114 can use the created DAG to identify a sequence of software build tasks to be performed or completed by program 142, as described in greater detail below. In one embodiment, after identifying a sequence of software build tasks to be completed for a software build workload, scheduler 114 assigns the identified software build tasks to executor 148 which are eventually completed by programs 142, as described in greater detail below. In one embodiment, scheduler 114 can assign an identified software build task to executor 148 based on whether a computer system 140 is available to handle the assigned software build task. For example, computer system 140 may be available if it is currently operational (i.e., online). In another example, computer system 140 may be available if a number of queued software build tasks managed by executor 148 is less than a specified threshold. Furthermore, scheduler 114 may use the created DAG to determine a replication factor, as described in greater detail below.

Metadata server 112 represents a storage repository configured to store information regarding an assignee of each identified software build task (i.e., executor 148), as well as the information regarding the memory locations of replicated software build artifacts (e.g., object files) stored in memory cache or local disk on each compute node 149, as described in greater detail below. Furthermore, scheduler 114 and metadata server 112 are operationally coupled, such that I/O file dependencies between tasks are understood by metadata server 112. In typical implementations a metadata server is part of the filesystem layer and a scheduler is part of the computing processing layer and don't interact closely.

Computer system 140 represents a platform configured to receive, manage, and perform software build tasks assigned by scheduler 114. Computer system 140 can be a desktop computer, a laptop computer, a specialized computer server, or any other computer system known in the art. In certain embodiments, computer system 140 represents a computer system utilizing clustered computers and components to act as a single pool of seamless resources when accessed through network 120. In one embodiment, more than one computer system 140 is implemented in software build environment 100. For example, three computer systems 140 can be implemented, such that each of the three computer systems 140 receive, manage, and perform software build tasks in parallel. In this embodiment, computer system 140 includes program 142, virtual file system (VFS) driver 144, local storage 146, executor 148, and memory cache 149. In another embodiment, computer system 110 may include components of computer system 140 in addition to metadata server 112 and scheduler 114, and carry out functions performed by computer system 140, as described herein.

Executor 148 represents a software program configured to manage software build tasks assigned by scheduler 114. In this embodiment, executor 148 includes memory cache 149 which store software build artifacts that have been replicated in accordance to a determined replication factor, as described in greater detail below. In one embodiment, executor 148 may manage a queue of assigned software build tasks to be performed by a program 142. For example, executor 148 may manage a queue containing five software build tasks, and scheduler 114 may assign a sixth software build task to executor 148. In this example, after the program 142 completes the five queued software build tasks, executor 148 may initiate and control the sixth software build task as an operating system (OS) process on computer system 140, such that program 142 may perform and complete the software build task. In one embodiment, if more than one computer system 140 is implemented in software build environment 100 for completing software build tasks in parallel, then each of the more than one computer system 140 can include a corresponding executor 148.

Figure 2A:
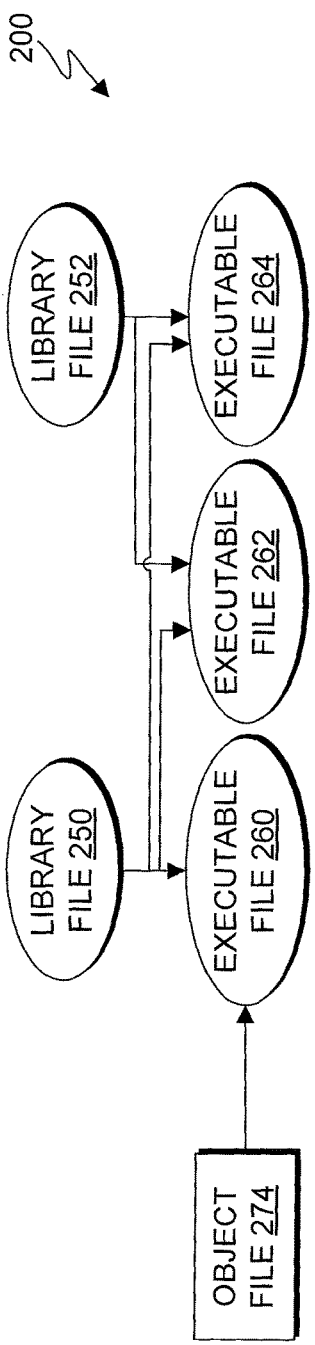
FIGS. 2A and 2B are functional block diagrams illustrating an example for determining a replication factor based on a dependency graph, in accordance with an embodiment of the present invention.
Figure 2B:
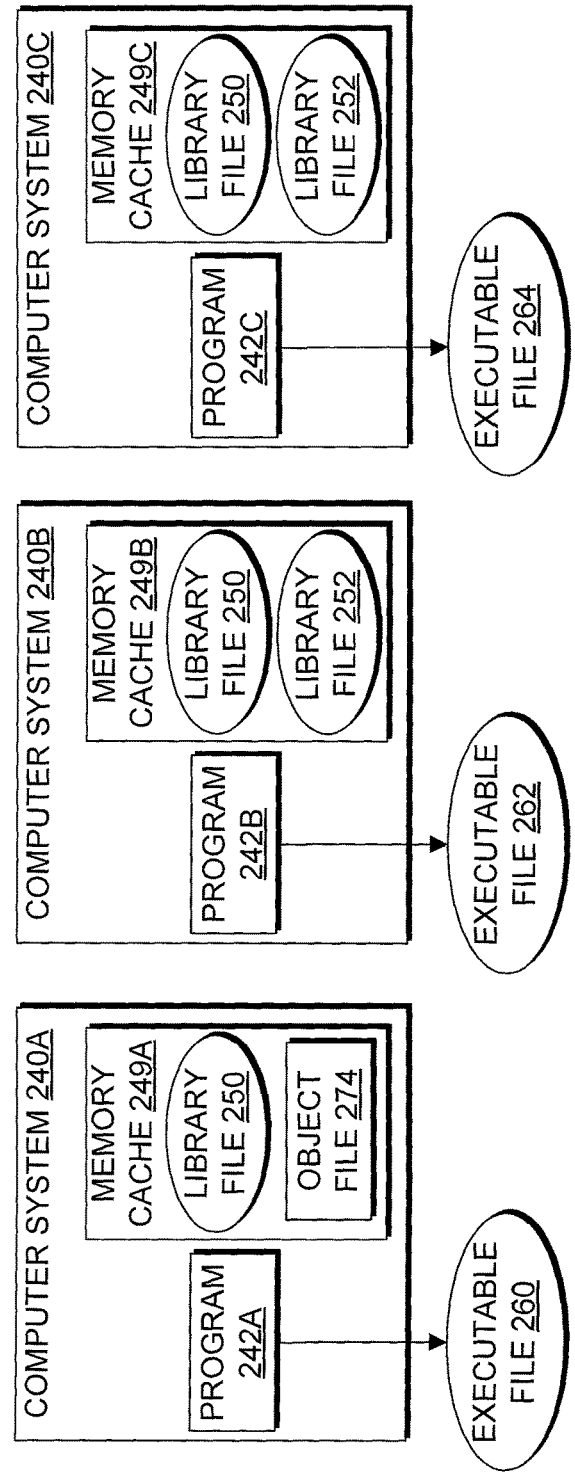

Memory cache 148 represents a storage repository configured to store software build artifacts including object files and static library files, as described in greater detail in FIGS. 2A and 2B. Typically, object files and static library files are stored in shared storage 130. In contrast, embodiments of the present invention store replicated software build artifacts in memory cache 149 based on a determined replication factor. A replication factor indicates a number of copies of a software build artifact that need to be created and stored in memory cache 149, such that a linker of a program 142 can have access to the software build artifacts stored in memory cache 149 during a linking process. Accordingly, such access of object files and static library files stored in memory cache 149 reduces a number of file I/O requests to shared storage 130. In one embodiment, if more than one computer system 140 is implemented in software build environment 100 for completing software build tasks in parallel, then each of the more than one computer system 140 can include a corresponding memory cache 149.

Program 142 represents a software program configured to perform OS processes initiated by executor 148. In one embodiment, program 142 can be configured to perform an OS process to complete a software build task in parallel to additional programs 142 (not depicted) operating on additional computer systems 140 (not depicted). In one embodiment, program 142 may include more than software program, such as a preprocessor, a compiler, an assembler, and a linker. For example, one of the software build tasks that program 142 is performing may be a linking process to link object files and libraries to create a final executable file. In this example, once assemblers of program 142 generate the object files, then scheduler 114 indicates to replicate and store necessary object files in memory cache 149. Necessary object files may be object files required by program 142 to complete the linking process. Furthermore, the linking process performed on computer system 140 can be performed before or after all source code complies by a compiler of program 142 are completed.

VFS driver 144 represents a software program that handles requests to receive source code stored in shared storage 130 and software build artifacts stored in memory cache 149. In this embodiment, program 142 can receive software build artifacts and source code from VFS driver 144 by performing file I/O operations (e.g., open, read, write, and close). VFS driver 144 directs the file I/O requests based on a type of request. For example, VFS driver 144 may direct file I/O requests for source code to shared storage 130. In another example, requests for software build artifacts, such as object files and binaries, are directed executor 148 which maintains software build artifacts stored in memory cache 149.

Local storage 146 represents a storage repository configured to store build artifacts including replicated object files once a threshold of memory cache 149 is exceeded. For example, if an object file is replicated and is designated by scheduler 114 to be stored in memory cache 149 and memory cache 149 does not have sufficient memory storage to store the object file (i.e., the memory threshold is exceeded), then computer system 140 may store the object file in local storage 146.

Shared storage 130 represents a storage repository using a SAN, NAS or other type that allows shared access, to provide direct disk access for computer system 110 and computer system 140 at a block (i.e., a physical record) level. In this embodiment, shared storage 130 stores source files containing source code and receives file I/O requests from computer systems 110 and 140 and components therein. In one embodiment, shared storage 130 may be a shared-disk file system implementing concurrency control mechanisms configured to provide a consistent and serializable view of the shared-disk file system and avoid corruption and unintended data loss even when more than one of computer systems 110 and 140 attempt to access the same physical record simultaneously.

In one embodiment, multiple users can use software build environment 100 to concurrently handle software build workloads. In this instance, a hash function can be applied to contents of a software build artifact, and in some instances to a command line argument to open the software build artifact, to generate an identifier (e.g., a hash code) for the software build artifact. Accordingly, scheduler 114 can analyze hash codes for each software build artifact to distinguish whether two versions of a same software build artifact differ, without having to open the software build artifact and analyze the contents thereof.

FIG. 2A is a functional block diagram illustrating an example of a dependency graph 200, in accordance with an embodiment of the present invention. Dependency graph 200 includes vertices (e.g., executable files 260-264, library files 250-252, object file 274) and edges that can be used to identify dependents and a replication factor. In this embodiment, dependents for object file 274, library file 250, and library file 252 include: executable file 260; executable files 260, 262 and 264; and executable files 262 and 264, respectively. A number of edges originating from object file 274, library file 250, and library file 252 may be used to determine a replication factor. For example, a replication factor for object file 274 is 1, a replication factor for library file 250 is 2, and a replication factor for library file 254 is 3.

FIG. 2B is a functional block diagram illustrating computer systems 240A-C in a distributed compiling environment, in accordance with an embodiment of the present invention. Each one of computer systems 240A-C represents computer system 140, as previously described with regard to FIG. 1. Furthermore, each one of computer systems 240A-C include a corresponding one of: memory caches 249A-C and programs 242A-C, which represent memory cache 149 and program 142, respectively, as previously described with regard to FIG. 1. In one embodiment, computer systems 240A-C are identified as nodes in which a linking process will take place. For example, program 242A generates executable file 260 by linking object file 274 and library file 250, program 242B generates executable file 262 by linking library file 250 and library file 252, and program 242C generates executable file 264 by linking library file 250 and library file 252. Such nodes (e.g., computer systems 240A-C) can be identified based on software build tasks identified from a DAG created by a scheduler, such as scheduler 114, as previously described with regard to FIG. 1. Accordingly, memory cache 249A of computer system 240A receives and stores replicated library 250 and object file 274, such that a linker of program 242A can complete a linking process to generate executable file 260. As previously described in FIG. 2A, the number of edges connecting dependents (e.g., executable files 260-264) to object file 274, library files 250 and 252 to can be used to determine a replication factor.

Figure 3:
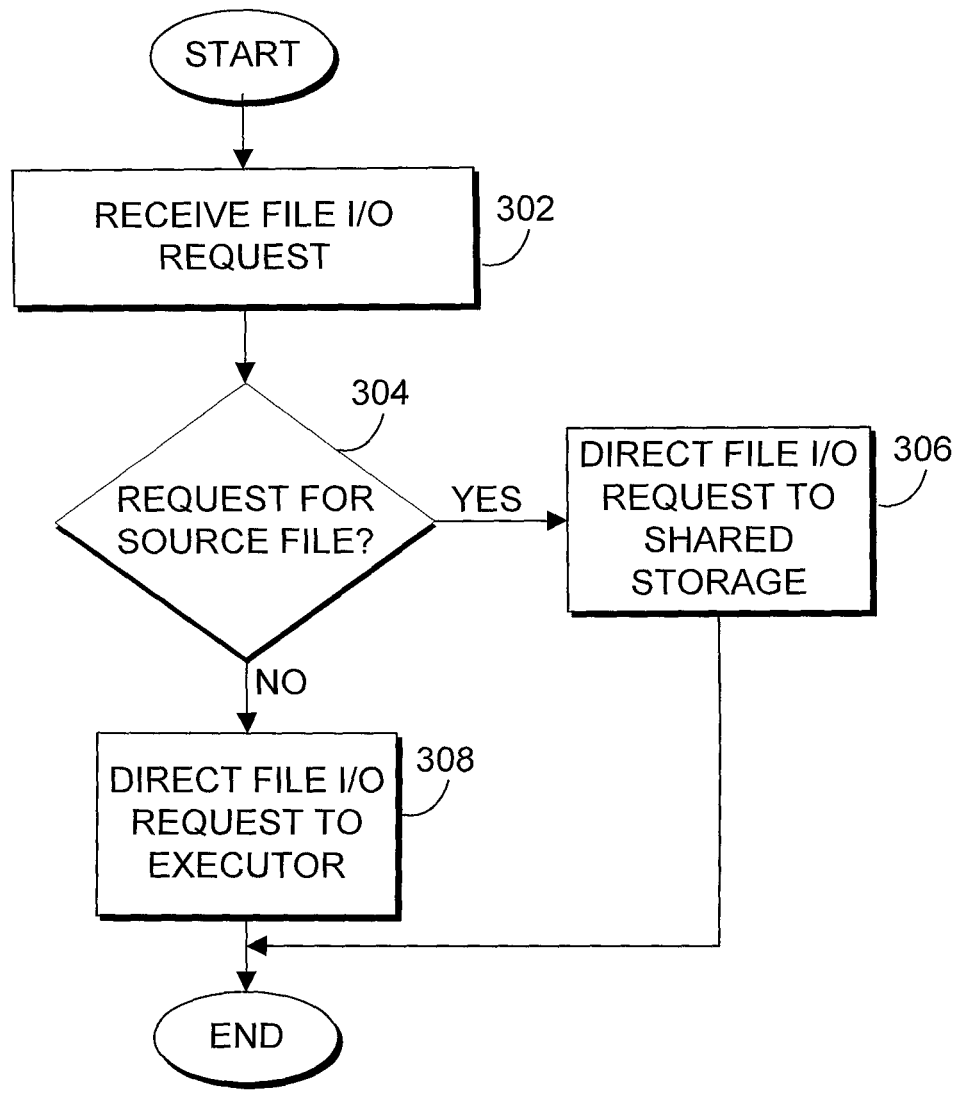
FIG. 3 is a flowchart illustrating operational steps for directing file I/O requests, in accordance with an embodiment of the present invention.

FIG. 3 is a flowchart illustrating operational steps for directing file I/O requests, in accordance with an embodiment of the present invention. In this embodiment, VFS driver 144 is configured to direct a file I/O request in software build environment 100, as previously described in FIG. 1. For example, VFS driver 144 can receive a file I/O request from program 142 (step 302).

If VFS driver 144 determines that the received file I/O request is for a source file ('yes' branch, decision 304), then VFS driver 144 directs the file I/O request to shared storage 130 to fulfill the request to receive the source file (step 306).

If VFS driver 144 determines that the received file I/O request is not for a source file (e.g., a file I/O request for an object file or library file) ('no' branch, decision 304), then VFS driver 144 directs the file request to executor 148, and the requested file can be accessed (step 308).

It should be understood that operational steps described herein can be similarly carried out by other computer systems 140 using a corresponding VFS driver 144, program 142, and executor 148.

Figure 4:
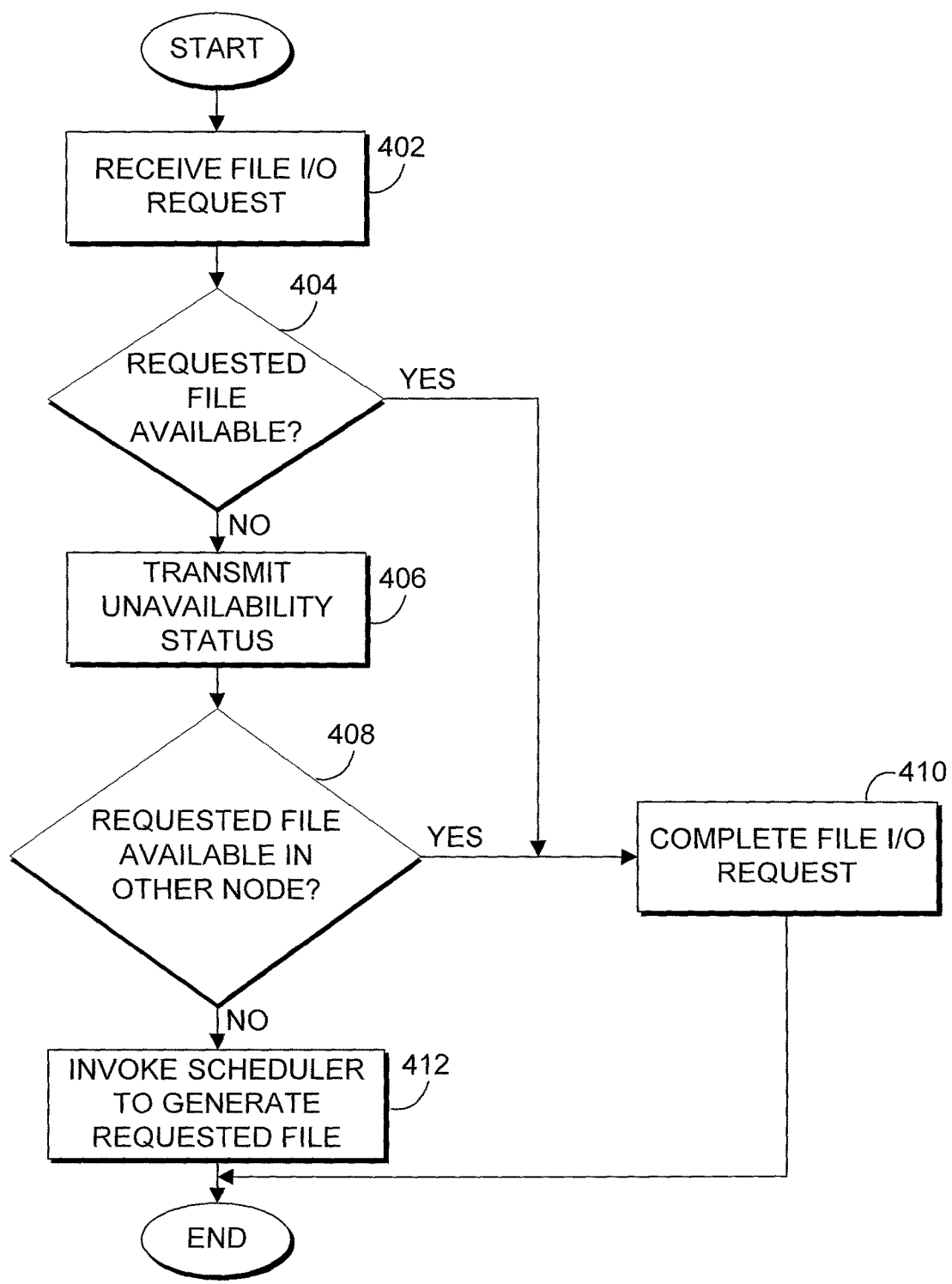
FIG. 4 is a flowchart illustrating operational steps for processing file I/O requests, in accordance with an embodiment of the present invention.

FIG. 4 is a flowchart illustrating operational steps for processing file I/O requests, in accordance with an embodiment of the present invention. In this embodiment, the I/O requests processed in software build environment 100 using operational steps described in FIG. 4 are I/O requests that are directed to executor 148, as previously described in FIG. 3.

For example, executor 148 receives an object file I/O request from VFS driver 144 (step 402). Executor 148 determines whether the object file is available in memory cache 149 (i.e., completely assembled and stored) (decision 404).

If executor 148 determines that the object file is not available in memory cache 149 ('no' branch, decision 404), then executor 148 transmits a message to metadata server 112 indicating the unavailability of the object file in memory cache 149 (step 406). If executor 148 determines that the object file is available in memory cache 149 ('yes' branch, decision 404), then executor 148 completes the file I/O request by providing program 142 with the requested object file (step 410).

Metadata server 112 determines whether the requested object file is available in another one of memory caches 149 (i.e., another memory cache 149 of another computer system 140) (decision 408). If metadata server 112 determines that the requested object file is available in another one of memory caches 149 ('yes' branch, decision 408), then the corresponding executor 148 completes the file I/O request by providing the corresponding program 142 with the requested object file (step 410). If metadata server 112 determines that the requested object file is not available in any other one of memory caches 149 ('no' branch, decision 408), then metadata server 112 invokes scheduler 114 to assign a software build task to executor 148 for assembling, or generate, the requested object file (step 412).

It should be understood that operational steps described herein can be similarly carried out by other computer systems 140 using metadata server 112 and scheduler 114 of computer system 110, and corresponding VFS driver 144, program 142, and executor 148 of the other computer systems 140. Furthermore, although the requested file in FIG. 4 is an object file, it should be understood that any other necessary software build artifact, such as a static library file, can be a requested file, whereby operational steps described herein can be similarly applied.

Figure 5:
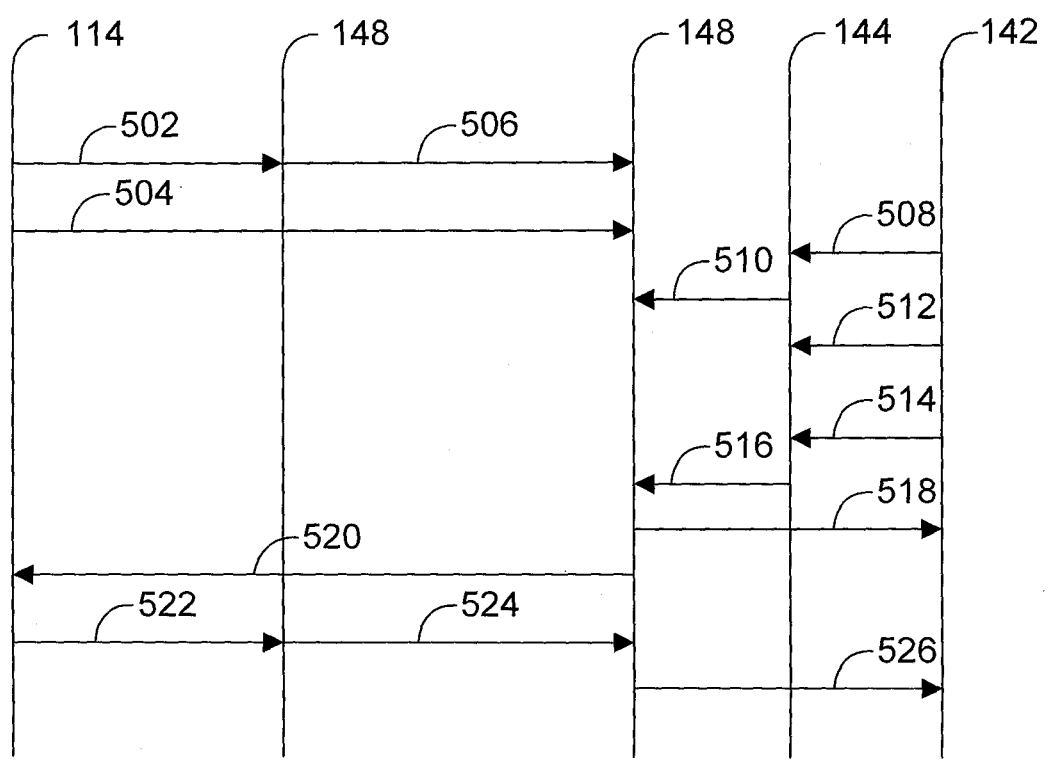
FIG. 5 is a functional block diagram illustrating an interleaved software compilation process, in accordance with an embodiment of the present invention.

FIG. 5 is a functional block diagram illustrating an example interleaved compilation process, in accordance with an embodiment of the present invention. The interleaved compilation process described herein can be carried out by software build environment 100, such that computer system 110 and more than one computer system 140 can be implemented. First, scheduler 114 assigns software build tasks to executors 148 of the more than one computer system 140 for managing preprocessing of source code, compiling of source code, and assembling object files (flow 502). Subsequently, once object files are assembled, the object files are replicated, based on a determined replication factor, and stored to memory caches 149 of the more than one computer systems 140 managed by a corresponding executors 148 (flow 506). At some time, scheduler 114 may identify one of the more than one computer systems 140 as a linker node, where a linker of program 142 in the linker node links object files and libraries stored in memory cache 149 (flow 504). The linker of program 142 in the linker node transmits an object file I/O request to VFS driver 144 of the linker node to open one of the object files stored in memory cache 149 of the linker node (flow 508). Then, VFS driver 144 of the linker node directs the object file I/O request to executor 148 of the linker node for access to memory cache 149 of the linker node (flow 510). Afterwards, the linker of program 142 in the linker node transmits another object file I/O request to VFS driver 144 of the linker node to read the object file stored in memory cache 149 of the linker node (flow 512). At some later time, the linker of program 142 of the linker node transmits another object file I/O request to VFS driver 144 of the linker node (flow 514), which is then directed to executor 148 of the linker node for access to memory cache 149 of the linker node (flow 516). In this embodiment, executor 148 of the linker node interacts with metadata server 112 and determines the requested object file is not available in any memory caches 149 of the more than one computer systems 140, and accordingly the linking process is suspended (flow 518). Executors 148 can invoke scheduler 114 to request a software build task that completes generation (i.e., assembly) of the requested object code (flow 520). In response, scheduler 114 assigns the software build task to executors 148 of the more than one computer system 140 (flow 522), and replicates the generated requested object file, based on a determined replication factor, and stores the replicated object file in memory cache 149 of the linker node (flow 524). Finally, executor 148 of the linker node indicates the linker of program 142 of the linker node to resume the linking process once the replicated object file is stored in memory cache 149 of the linker node (flow 526).

Figure 6:
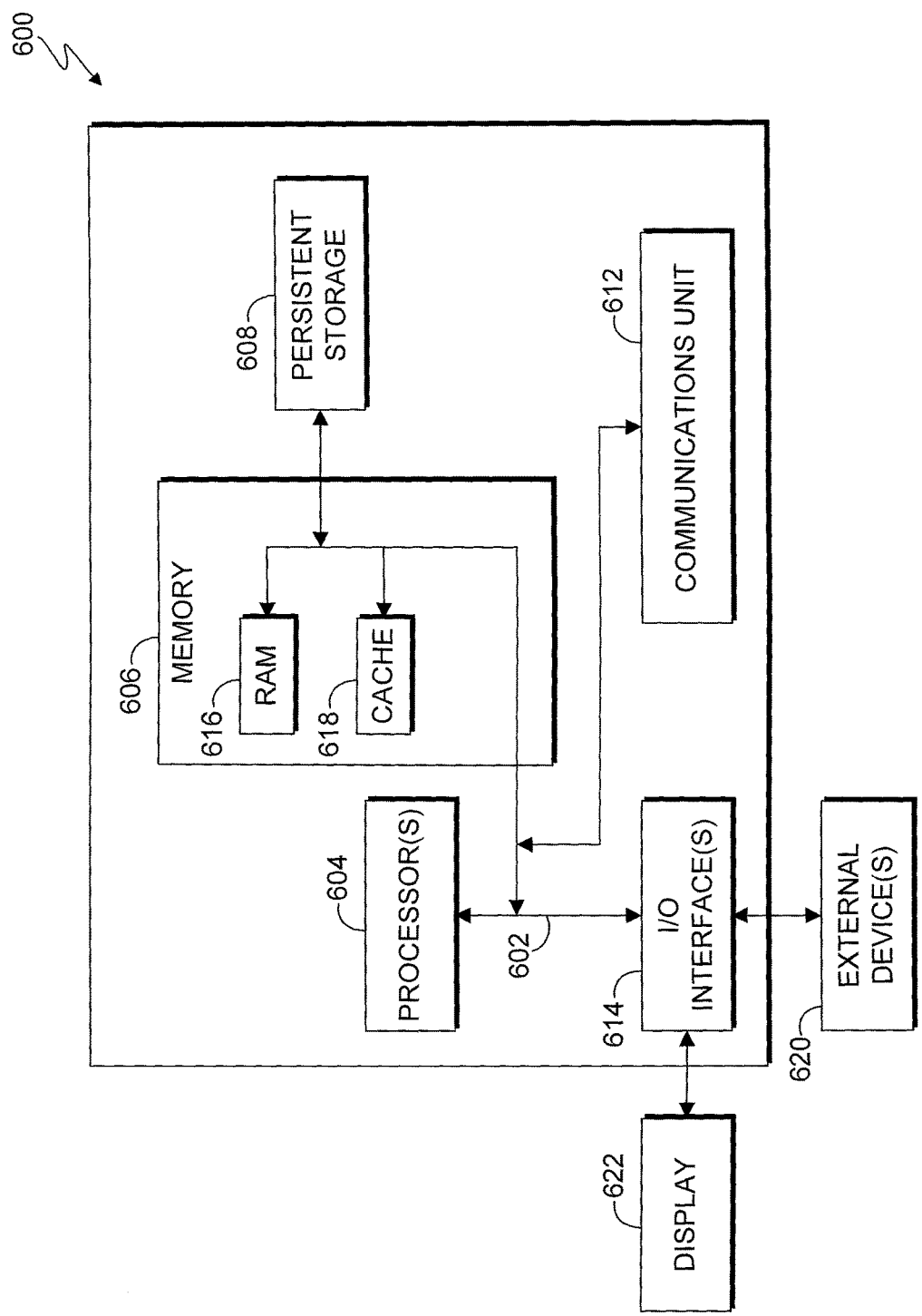
FIG. 6 is a block diagram of internal and external components of the computer systems of FIG. 1, in accordance with an embodiment of the present invention.

FIG. 6 is a block diagram of internal and external components of a computer system 600, which is representative the computer systems 110 and 140 of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., network 120). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620, such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

Figure 7:
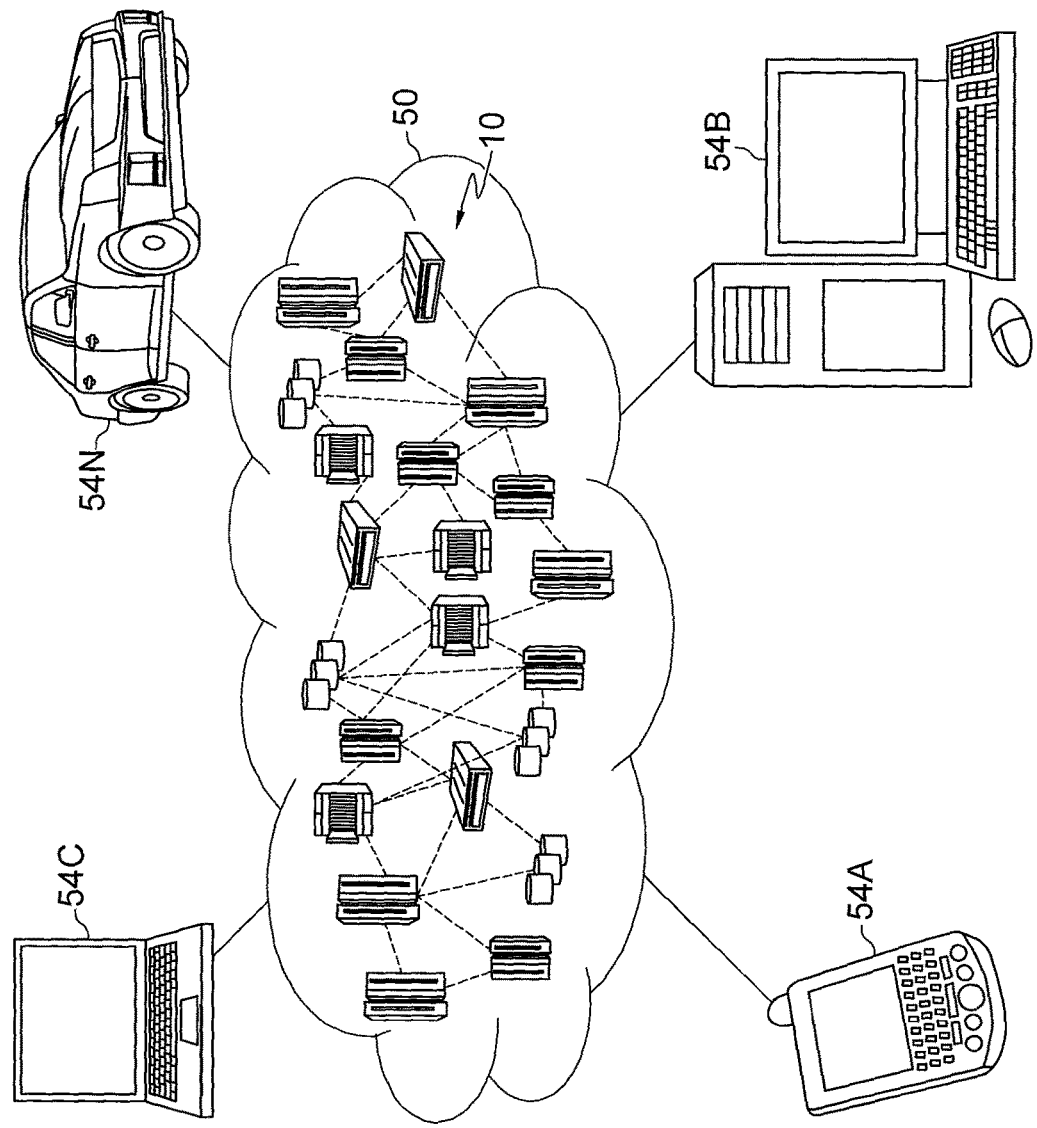
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 9 are intended to be illustrative only and that cloud computing nodes 10 and cloud computing environment 50 can communicate with any type of computerized device over any type of network and/or network addressable connection (e.g., using a web browser).

Figure 8:
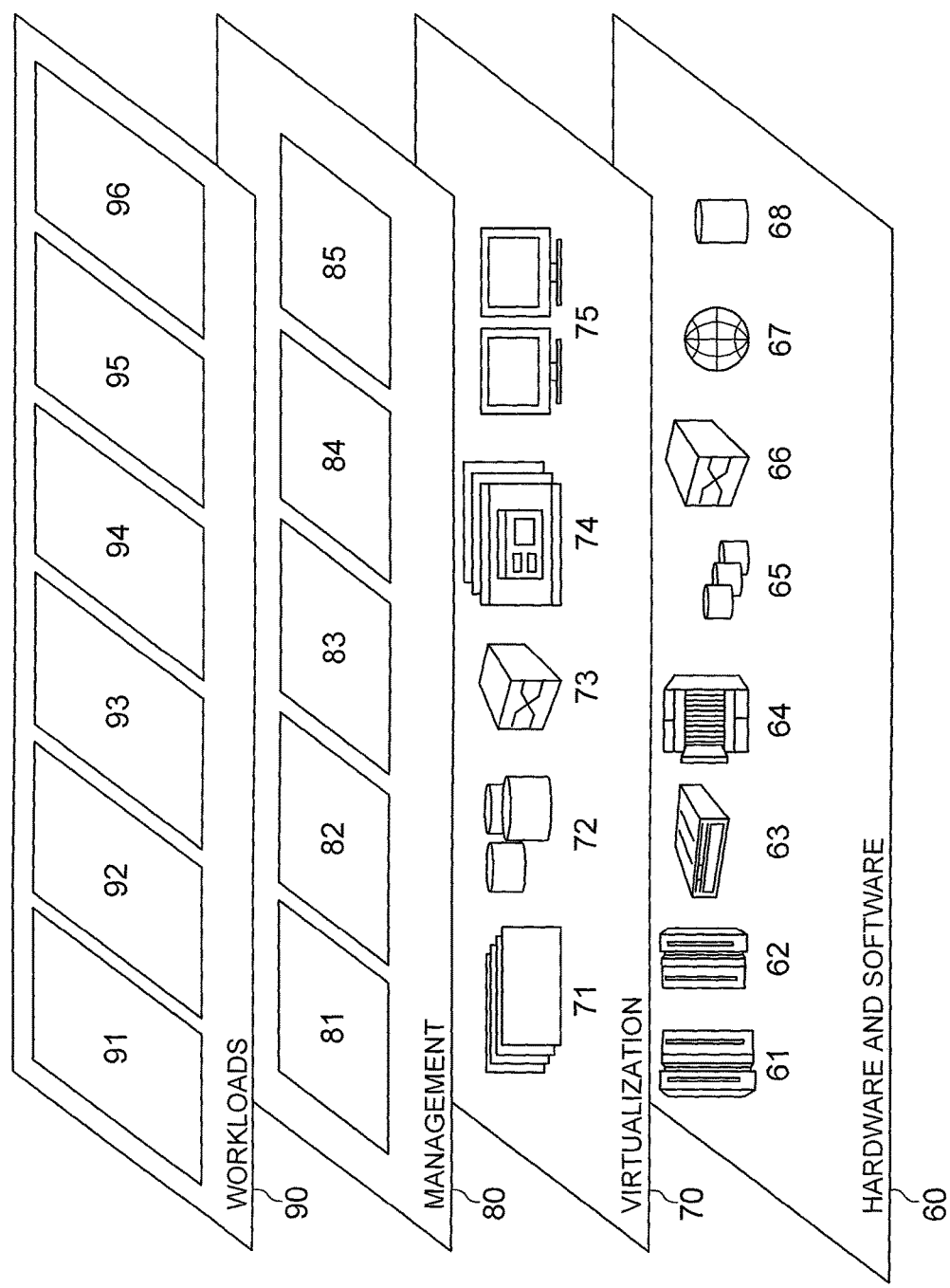
FIG. 8 depicts abstraction model layers, in accordance with an embodiment of the present invention.

Referring now to FIG. 8, a set of functional abstraction layers provided by cloud computing environment 50 (FIG. 7) is shown. The components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software build environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    storing, by a computer processor, a set of source files in a shared storage repository for nodes of a distributed computing environment for software compilation;
    creating, by the computer processor, an object file based on at least a portion of the set of source files;
    generating, by the computer processor, a directed acyclic graph (DAG) corresponding to a group of software build tasks and the relationship between the software build tasks based on the set of source files;
    determining, by the computer processor, a replication factor for the object file based on the number of relationships of the object file identified from the DAG, wherein the replication factor indicates a number of copies of the object file to replicate and store to the local memory cache of each node of the number of nodes;
    storing, by the computer processor, the object file in a local memory cache of at least one of the number of the nodes, wherein the number of the nodes is based on the replication factor for the object file;
    receiving, by the computer processors, a first file I/O request for the object file;
    responsive to determining that the object file is stored in the local memory cache, completing, by the computer processor, the first file I/O request;
    responsive to determining that the object file is not stored in the local memory cache, transmitting, by the computer processor, a status message to the metadata server indicating that the object file is unavailable in the local memory cache, and determining whether the object file is stored in another local memory cache using the information stored in the metadata server;

responsive to determining that the object file is stored in the other local memory cache, transmitting, by the computer processor, the object file from the other local memory cache to the local memory cache; and responsive to determining that the object file is not stored in the other local memory cache, invoking, by the computer processor, the scheduler to assign a software build task for assembling the object file and subsequently transmitting the object file to the local memory cache to complete the first file I/O request.

2. The method of claim 1, wherein each of the nodes includes a program configured to perform at least one of the software build tasks selected from the group consisting of: preprocessing by a preprocessor component of the program, compiling by a compiler component of the program, assembling by an assembler component of the program, and linking by a linker component of the program.

3. The method of claim 1, wherein each of the nodes includes an executer component configured to manage the respective local memory cache and manage the respective program.

4. The method of claim 1, further comprising:
a scheduler component for generating the DAG and assigning the software build tasks identified from the DAG to the nodes, and
a metadata server storing information identifying the software build tasks assigned to the nodes and information identifying the local memory cache of at least one of the number of the nodes storing the replicated object file.

5. The method of claim 3, further comprising:
receiving, by the computer processor, a second file I/O request from a virtual file system (VFS) driver;
determining, by the computer processor, whether the second file I/O request is a source file I/O request;
responsive to determining that the second file I/O request is the source file I/O request, directing, by the computer processor, the second file I/O request to the shared storage repository to complete the source file I/O request;
responsive to determining that the second file I/O request is not the source file I/O request, determining, by the computer processor, whether the second file I/O request is a request to receive the object file; and
responsive to determining that the second file I/O request is a request to receive the object file, directing, by the computer processor, the second file I/O request to the executer component.

6. A computer program product comprising:
one or more computer readable storage media and program instructions stored on the one or more computer readable storage media, the program instructions comprising:
program instructions to store a set of source files in a shared storage repository for nodes of a distributed computing environment for software compilation;
program instructions to create an object file based on at least a portion of the set of source files;
program instructions to generate a directed acyclic graph (DAG) corresponding to a group of software build tasks and the relationship between the software build tasks based on the set of source files;
program instructions to determine a replication factor for the object file based on the number of relationships of the object file identified from the DAG, wherein the replication factor indicates a number of copies of the object file to replicate and store to the local memory cache of each node of the number of nodes;
program instructions to store the object file in a local memory cache of at least one of the number of the nodes, wherein the number of the nodes is based on the replication factor for the object file;
program instructions to receive a first file I/O request for the object file;
program instructions to, responsive to determining that the object file is stored in the local memory cache, complete the first file I/O request;
program instructions to, responsive to determining that the object file is not stored in the local memory cache, transmit a status message to the metadata server indicating that the object file is unavailable in the local memory cache, and determine whether the object file is stored in another local memory cache using the information stored in the metadata server;
program instructions to, responsive to determining that the object file is stored in the other local memory cache, transmit the object file from the other local memory cache to the local memory cache; and
program instructions to, responsive to determining that the object file is not stored in the other local memory cache, invoke the scheduler to assign a software build task for assembling the object file and subsequently transmitting the object file to the local memory cache to complete the first file I/O request.

7. The computer program product of claim 6, wherein each of the nodes includes a program configured to perform at least one of the software build tasks selected from the group consisting of: preprocessing by a preprocessor component of the program, compiling by a compiler component of the program, assembling by an assembler component of the program, and linking by a linker component of the program.

8. The computer program product of claim 6, wherein each of the nodes includes an executer component configured to manage the respective local memory cache and manage the respective program.

9. The computer program product of claim 6, further comprising:
a scheduler component for generating the DAG and assigning the software build tasks identified from the DAG to the nodes, and
a metadata server storing information identifying the software build tasks assigned to the nodes and information identifying the local memory cache of at least one of the number of the nodes storing the replicated object file.

10. The computer program product of claim 8, wherein the program instructions stored on the one or more computer readable storage media further comprise:
program instructions to receive a second file I/O request from a virtual file system (VFS) driver;
program instructions to determine whether the second file I/O request is a source file I/O request;
program instructions to, responsive to determining that the second file I/O request is the source file I/O request, direct the second file I/O request to the shared storage repository to complete the source file I/O request;
program instructions to, responsive to determining that the second file I/O request is not the source file I/O request, determine whether the second file I/O request is a request to receive the object file; and program instructions to, responsive to determining that the second file I/O request is a request to receive the object file, direct the second file I/O request to the executor component.

11. A computer system comprising:

one or more computer processors;

one or more computer readable storage media;

program instructions stored on the one or more computer readable storage media for execution by at least one of the one or more processors, the program instructions comprising:

program instructions to store a set of source files in a shared storage repository for nodes of a distributed computing environment for software compilation;

program instructions to create an object file based on at least a portion of the set of source files;

program instructions to generate a directed acyclic graph (DAG) corresponding to a group of software build tasks and the relationship between the software build tasks based on the set of source files;

program instructions to determine a replication factor for the object file based on the number of relationships of the object file identified from the DAG, wherein the replication factor indicates a number of copies of the object file to replicate and store to the local memory cache of each node of the number of nodes;

program instructions to store the object file in a local memory cache of at least one of the number of the nodes, wherein the number of the nodes is based on the replication factor for the object file;

program instructions to receive a first file I/O request for the object file;

program instructions to, responsive to determining that the object file is stored in the local memory cache, complete the first file I/O request;

program instructions to, responsive to determining that the object file is not stored in the local memory cache, transmit a status message to the metadata server indicating that the object file is unavailable in the local memory cache, and determine whether the object file is stored in another local memory cache using the information stored in the metadata server;

program instructions to, responsive to determining that the object file is stored in the other local memory cache, transmit the object file from the other local memory cache to the local memory cache; and program instructions to, responsive to determining that the object file is not stored in the other local memory cache, invoke the scheduler to assign a software build task for assembling the object file and subsequently transmitting the object file to the local memory cache to complete the first file I/O request.

12. The computer system of claim 11, wherein each of the nodes includes a program configured to perform at least one of the software build tasks selected from the group consisting of: preprocessing by a preprocessor component of the program, compiling by a compiler component of the program, assembling by an assembler component of the program, and linking by a linker component of the program.

13. The computer system of claim 11, wherein each of the nodes includes an executer component configured to manage the respective local memory cache and manage the respective program.

14. The computer system of claim 11, further comprising:

a scheduler component for generating the DAG and assigning the software build tasks identified from the DAG to the nodes, and a metadata server storing information identifying the software build tasks assigned to the nodes and information identifying the local memory cache of at least one of the number of the nodes storing the replicated object file.

15. The computer system of claim 13, wherein the program instructions stored on the one or more computer readable storage media further comprise:

program instructions to receive a second file I/O request from a virtual file system (VFS) driver;

program instructions to determine whether the second file I/O request is a source file I/O request;

program instructions to, responsive to determining that the second file I/O request is the source file I/O request, direct the second file I/O request to the shared storage repository to complete the source file I/O request;

program instructions to, responsive to determining that the second file I/O request is not the source file I/O request, determine whether the second file I/O request is a request to receive the object file; and program instructions to, responsive to determining that the second file I/O request is a request to receive the object file, direct the second file I/O request to the executor component.

* * * * *